US006264735B1

(12) United States Patent
Bean et al.

(10) Patent No.: US 6,264,735 B1
(45) Date of Patent: Jul. 24, 2001

(54) LOW-LEAD LEACHING FOAMED CONCRETE BULLET BARRIER

(75) Inventors: Dennis L. Bean, Vicksburg; Charles Arthur Weiss, Jr., Clinton; Philip G. Malone, Vicksburg, all of MS (US); James E. Sigurdson, Toronto (CA)

(73) Assignee: U.S. Army Corps of Engineers as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/176,253

(22) Filed: Oct. 21, 1998

(51) Int. Cl.[7] .................................................. C04B 38/08
(52) U.S. Cl. ..................... 106/672; 106/644; 106/677; 106/724; 106/738; 264/333
(58) Field of Search ................................. 106/672, 643, 106/644, 677, 724, 738; 264/333

(56) References Cited

U.S. PATENT DOCUMENTS

| 4,401,471 | * | 8/1983 | Eckardt et al. | 106/672 |
|---|---|---|---|---|
| 4,596,834 | * | 6/1986 | Widener et al. | 521/83 |
| 5,037,479 | | 8/1991 | Stanforth | 106/691 |
| 5,171,362 | | 12/1992 | Nakayama | 106/14.12 |
| 5,202,033 | | 4/1993 | Stanforth et al. | 210/747 |
| 5,413,633 | | 5/1995 | Cook et al. | 106/672 |
| 5,591,116 | | 1/1997 | Pierce | 585/256 |
| 5,605,570 | | 2/1997 | Bean et al. | 106/673 |
| 5,900,053 | * | 5/1999 | Brothers et al. | 106/678 |

* cited by examiner

Primary Examiner—Anthony Green
(74) Attorney, Agent, or Firm—John MacEvoy

(57) ABSTRACT

A method of forming low lead leaching foamed concrete is provided. The method includes the step of dry mixing cement with a suspending agent to form a dry mixture. Water is mixed with a fine aggregate to form an aqueous mixture. The dry mixture is mixed into the aqueous mixture to form a slurry. Calcium phosphate is mixed into the slurry until all constituents are throughly distributed throughout the resulting mixture. The density of the resulting mixture is determined and an aqueous foam is added to the resulting mixture until the density of the resulting mixture is reduced to a desired level. Fibers are mixed into the resulting mixture until the fiber is distributed throughout the final mixture. The final mixture is placed into a mold. The mixture is allowed to harden and cure.

12 Claims, No Drawings

LOW-LEAD LEACHING FOAMED CONCRETE BULLET BARRIER

FIELD OF THE INVENTION

The present invention relates to a fiber-reinforced, foamed-concrete, bullet barrier. More particularly, the invention relates to a foamed-concrete bullet barrier that contains chemical constituents that maintain the alkalinity of the concrete and reduce the solubility of lead.

BACKGROUND OF THE INVENTION

In order to train military personnel, live-fire training villages have been used to prepare such personnel for fighting. During these training exercises, numerous bullets become embedded in the panels of the buildings. Over time, the lead embedded into these non-ricocheting structures starts to corrode and as a result is released into the ground. Because there is significant environmental concern over the release of lead into the ground, barriers have been developed which tend to maintain the lead within the barrier and prevent the lead from leaching out into the surroundings.

In the past, a foamed, fiber-reinforced concrete has been used in non-ricocheting barriers to help maintain the lead within the barriers. This type of concrete has been particularly successful in structural panels for houses in live-fire training villages and in enclosures used for grenade training. Foamed-concrete is thought to be the best type of the bullet-trapping barrier material because it does not burn like wood or rubber, or rot, like wood, and cannot wash away like sand or soil. It is alkaline and retains lead better than wood or rubber.

When bullets containing lead are fired into barriers, the bullets and bullet fragments become lodged in the concrete matrix. The moisture in the barrier reacts with the lead and causes corrosion and dissolution of the lead. The alkalinity of the conventional foamed-concrete decreases and the pH of the water in contact with the bullet fragments may become reduced to the point where the lead and its corrosion products begin to dissolve; Lead particles may spall off from the barriers, and fall to the ground. The spalled materials are subject to corrosion, dissolution, and leaching during precipitation. This may cause significant environmental concern. Thus, there is a need in the art for a foamed concrete bullet barrier which may better retain heavy metals.

SUMMARY OF THE INVENTION

A method of forming low lead leaching foamed concrete includes the step of dry mixing cement with a suspending agent to form a dry mixture. Water is mixed with a fine aggregate to form an aqueous mixture. The dry mixture is mixed into the aqueous mixture to form a slurry. Calcium phosphate is mixed into the slurry until all constituents are throughly distributed throughout the resulting mixture. The density of the resulting mixture is determined and an aqueous foam is added to the resulting mixture until the density of the resulting mixture is reduced to a desired level. Fibers are mixed into the resulting mixture until the fiber is distributed throughout the final mixture. The final mixture is placed into a mold. The mixture is allowed to harden and cure.

DESCRIPTION OF TIRE PREFERRED EMBODIMENT

This invention solves the problem of the release of lead from bullet barriers. Even the best concrete barriers spall off fragments that may contain spent bullets. The materials which are spalled from the barriers contain lead, which may pose environmental concerns.

The present invention involves the addition of chemical compounds which reduce the rate of dissolution of lead particles, preventing the lead from being released from the bullet barriers. Specifically, calcium carbonate and calcium phosphate are added, which reduce the reactivity and rate of dissolution and corrosion of embedded lead bullets and bullet fragments. Foamed, fiber-reinforced concrete that contains calcium carbonate and calcium phosphate additives will not interfere with the foam stability in the fresh concrete, retard will not retard the setting or hardening reaction of the concrete.

The present invention uses the slow dissolution of less soluble calcium phosphate compounds and the alkalinity of the concrete and the calcium carbonate used as an aggregate to reduce the rate of dissolution of lead from bullet fragments fired into the foamed concrete barrier. The concrete is prepared in the following manner using the proportions shown in

TABLE 1

Proportioning of Foamed Concrete Containing Phosphate

| Component | Parts by Mass of Cement |
|---|---|
| Portland cement ASTM C 150 Type I-II | 1 |
| Fine aggregate (ASTM C 33) crushed limestone | 1 |
| Water (potable) | 0.4 |
| Stabilizer (Dow Methocel, K-100M) | 0.001 |
| Tribasic calcium phosphate | 0.05 |
| Aqueous based foam (Cellufoam Systems, Inc Scarsborough, Ontario, Canada) | Volume necessary to adjust density |
| Fiber, synthetic organic polypropylene (Fiber-Lok, Inc. Keller, TX) | 0.02 (or as needed to resist cracking) |

The cement is Portland ASTM C 150 cement, Type I–III, and the suspending agent or stabilizer is Dow Methocel K-100 M, made by Dow Chemical Company in Midland, Mich. Up to 10% of the cement by mass can be replaced with silica fume. The cement and suspending agent are dry mixed. The fill amount of water to be used is placed in the mixture. The fine aggregate is then added to the water. In the preferred embodiment, the fine aggregate is crushed limestone meeting the ASTM C 33 grading criteria.

After mixing action is initiated, the dry-mixed Portland cement and stabilizer are added to the mixer. The calcium phosphate compound is added, and mixing is continued until all constituents are throughly distributed throughout the mixture. The density of the concrete slurry is determined, and an aqueous foam is added to the concrete slurry until the density has been reduced to the desired level. Fiber is then added to the mixture. The fiber may be either synthetic fiber or steel fiber. Mixing is continued until the fiber is distributed throughout the mixture. The resulting mixture is then placed in molds to harden and cure. The concrete is allowed to moist cure, until it has gained sufficient strength to allow it to be demoted and put into service.

Tests with this type of concrete have been performed by making up the phosphate-rich, limestone-aggregate, concrete formulation, leaving out the foam and fiber but adding ten grams of technical-grade, lead powder for each 400 grams of cement used. Leach tests conducted with 0.1 N acetic acid to simulate acid soil water show that the phosphate-rich concrete leached less lead than the same formulation with sand aggregate and no phosphate additive.

With carbonate and phosphate present, the concentration of lead in the leachate was 0.17 ppm. Without the carbonate and phosphate added, the concentration of the lead in the leachate was 0.87 ppm.

The carbonate aggregate can be added up to a mass equal to mass of the cement. Preferably, the carbonate aggregate is sand-sized, graded, crushed limestone. The phosphate compound used can be selected from the group comprising calcium monobasic phosphate, calcium dibasic phosphate, and calcium tribasic phosphate, (or a combination of the group) up to 5% of the mass of the cement.

Experience with the additives suggests that the decrease in solubility of the lead is related to the formation of a surface coating on the lead particles. For example, the amount of phosphate added does not have to be related to the mass of the lead that may be captured; but to the amount of exposed lead that might need to be coated. The only limitation on the amount of phosphate added is that the amount of water needed increases as the amount of fine-granulated material increases. Increasing the water content of the concrete lowers its strength.

The addition of calcium phosphate and calcium carbonate to the cement has the effect of forming coatings on the bullets that will retard the corrosion of the lead. The coatings are thought to be lead phosphates or complex lead phosphate-carbonate compounds. The calcium carbonate and calcium phosphate additives are also thought to function by interacting with acidic rainwater or groundwater to raise the pH of the water coming in contact with the lead and reducing the rate of dissolution of the lead. Lead metal is more soluble in acidic water than in alkaline water in the normal acid-alkaline ranges for rainwater or groundwater. The new phosphate-rich foamed concrete has all of the best characteristics of regular foamed-concrete and has better characteristics with regard to retaining heavy metals. The new concrete formulation has much more alkalinity because of the carbonate and phosphate. The phosphate that does slowly dissolve reprecipitates on the lead as lead phosphate or lead phosphate-carbonate, forming an inert surface.

This invention can be used in firing range back stops, protective berms in front of targets or in blocks used to control erosion of firing ranges. The invention can also be used in mock villages that are used for live-fire troop training exercises.

We claim:

1. A method of forming low lead-leaching foamed concrete, comprising the steps of:
    a) providing about 1 part Portland cement;
    b) providing about 0.001 part stabilizer by mass of the cement;
    c) dry mixing the Portland cement and the stabilizer thereby forming a dry mixture;
    d) providing a quantity of water and adding about 1 part crushed limestone by mass of the cement to form an aqueous mixture;
    e) mixing the dry mixture of step c) with the aqueous mixture of step d) thereby forming a slurry;
    f) adding about 0.05 part calcium phosphate by mass of the cement to the slurry;
    g) adjusting the density of the mixture obtained in step f) by adding an aqueous foam;
    h) mixing a quantity of a fiber to the mixture obtained in step g) until the fiber is distributed throughout the mixture;
    i) placing the final mixture obtained in step h) in a mold; and
    j) allowing the final mixture to harden and cure.

2. The method of claim 1, further comprising the step of:
    k) allowing the final mixture to moist cure until the mixture has gained sufficient strength to then be demolded.

3. The method of claim 1, further comprising the step of:
    k) demolding the resulting hardened foamed-concrete to form a bullet barrier.

4. The method of claim 1, wherein:
the fiber is selected from the group consisting of synthetic fiber and steel fiber.

5. The method of claim 1, wherein:
the crushed limestone comprises calcium carbonate.

6. The method of claim 1, wherein:
the calcium phosphate is selected from the group consisting of calcium monobasic phosphate, calcium dibasic phosphate, calcium tribasic phosphate, and a combination thereof.

7. The method of claim 6, wherein:
about 0.4 part potable water is used as the water.

8. The method of claim 1, wherein:
the amount of fiber in step h) comprises about 0.02 part by mass of the cement.

9. The method of claim 8, wherein the fiber comprises synthetic polypropylene fiber.

10. A low leading leaching foamed-concrete made in accordance with the process of claim 1.

11. A lead corrosion inhibiting hardened concrete for bullet barriers, comprising:
    a) about 1 part Portland cement;
    b) about 1 part crushed limestone by mass of the cement;
    c) a quantity of foam;
    d) a quantity of a fiber selected from the group consisting of synthetic fiber and steel fiber; and
    e) about 0.05 part calcium phosphate by mass of the cement.

12. The concrete of claim 11, wherein:
the calcium phosphate is selected from the group consisting of calcium monobasic phosphate, calcium dibasic phosphate, calcium tribasic phosphate, and a combination thereof.

* * * * *